United States Patent
Kitazaki et al.

(10) Patent No.: US 7,487,044 B2
(45) Date of Patent: Feb. 3, 2009

(54) APPARATUS AND METHOD FOR PREDICTING A BREAKING DISTANCE OF A VEHICLE

(75) Inventors: Tsuyoshi Kitazaki, Kanagawa (JP); Jun Matsuda, Kanagawa (JP); Naoshi Miyashita, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 153 days.

(21) Appl. No.: 11/657,221

(22) Filed: Jan. 23, 2007

(65) Prior Publication Data

US 2007/0174002 A1 Jul. 26, 2007

(30) Foreign Application Priority Data

Jan. 24, 2006 (JP) ............................. 2006-015355

(51) Int. Cl.
*B60R 16/02* (2006.01)
*B60C 23/04* (2006.01)
*G06F 19/00* (2006.01)

(52) U.S. Cl. ........................... 701/301; 701/70; 701/78; 180/275

(58) Field of Classification Search ................ 701/301, 701/70, 76, 78, 80, 71, 75, 29, 33; 303/20, 303/3, 7, 15, 113.4, 155; 180/275
See application file for complete search history.

(56) References Cited

U.S. PATENT DOCUMENTS

| | | | | |
|---|---|---|---|---|
| 5,158,343 | A | * | 10/1992 | Reichelt et al. .......... 303/113.4 |
| 5,411,322 | A | * | 5/1995 | Breen ............................ 303/7 |
| 6,267,194 | B1 | * | 7/2001 | Bullinger et al. ............ 180/275 |
| 6,473,681 | B1 | * | 10/2002 | Eckert et al. .................. 701/70 |
| 2005/0085987 | A1 | | 4/2005 | Yokota et al. |

FOREIGN PATENT DOCUMENTS

| | | |
|---|---|---|
| JP | 2001-126196 | 5/2001 |
| JP | 2002-163793 | 6/2002 |
| JP | 2003-182476 | 7/2003 |
| JP | 2005-063398 | 3/2005 |

* cited by examiner

*Primary Examiner*—Tan Q Nguyen
(74) *Attorney, Agent, or Firm*—Knobbe Martens Olson & Bear LLP

(57) ABSTRACT

An apparatus and method acquires acceleration data in a time series of a predetermined site of the tire during traveling of the vehicle, and removes an acceleration component due to a deformation of the tire from the acquired acceleration data to obtain a modified acceleration data, and performs frequency analysis of the modified acceleration data to obtain a frequency spectrum, and obtains an accumulated value of the frequency spectrum, and calculating a braking distance parameter for predicting a braking distance based on the obtained accumulated value, and obtains a predicted value of the braking distance of the vehicle based on the braking distance parameter calculated in the calculating part.

18 Claims, 9 Drawing Sheets

APPARATUS AND METHOD FOR PREDICTING A BREAKING DISTANCE OF A VEHICLE

CROSS REFERENCE TO RELATED APPLICATION

This application claims the benefit and priority to Japanese Application Number 2006-015355 filed on Jan. 24, 2006. The disclosure of the above-described application is hereby incorporated by reference in its entirety.

BACKGROUND OF THE INVENTION

The present invention relates to an apparatus and method for predicting a braking distance of a vehicle. The braking distance of a vehicle refers to a distance at which a vehicle having a plurality of wheels travels during a period from a commencement of a braking operation for stopping the vehicle to a complete stop of the vehicle, in the case where the braking operation is started while the vehicle is traveling.

In these days, a number of automobile vehicles have an antilock-brake system (ABS) so as to travel more safety. The ABS is operated in the case where an attempt is made so as to stop a traveling automobile vehicle suddenly, and prevents wheels from being locked during a braking operation, thereby minimizing the distance (braking distance) at which the vehicle travels during a period from the commencement of the braking operation of the vehicle to the complete stop of the vehicle.

However, as a matter of course, although the ABS has an effect of relatively decreasing a braking distance, it does not completely eliminate the braking distance itself. In order to allow an automobile vehicle to travel safely, a driver driving the vehicle needs to know as exactly as possible to which degree the vehicle travels before stopping, i.e., the length of a braking distance required for the vehicle to stop, in the case of attempting to stop the traveling vehicle. If the driver during driving exactly knows such a braking distance, for example, a driver driving a vehicle can exactly keep a distance required for safety between the vehicle driven by the driver and a vehicle traveling ahead of the vehicle driven by the driver. Further, for example, in the case of finding an obstacle ahead of the traveling vehicle, the driver can perform a braking operation at a suitable timing to stop the vehicle safely. In order to allow the vehicle to travel safely, it is necessary that the driver driving the vehicle knows the braking distance of the vehicle during driving of the vehicle.

Generally, as a rough index of the braking distance of a vehicle, an index in accordance with the vehicle speed during traveling and the like are known. However, the actual braking distance of a vehicle is associated with various factors such as the state of tires and the condition of a road surface, and hence, the braking distance of a vehicle varies largely depending upon the state of tires and the condition of a road surface. Therefore, a driver driving a vehicle cannot exactly know the braking distance of the vehicle during driving of the vehicle. JP 2003-182476 A discloses a road surface condition and tire traveling state estimating apparatus for estimating the traveling state of tires during traveling and the condition (road surface friction coefficient etc.) of a road surface with which the tires are in contact.

SUMMARY OF THE INVENTION

The road surface condition and tire traveling state estimating apparatus described in JP 2003-182476 A described above detects the vibration of tires or wheels of a traveling vehicle, and detects a vibrating level in a frequency band included in a partial frequency range among frequency spectra obtained by performing frequency analysis of the detected vibration. Then, the apparatus estimates the road surface condition (road surface friction coefficient) during traveling, the state of tires (tire internal pressure, friction, failure prediction), and the like from the detected vibrating level. JP 2003-182476 A estimates the road surface condition, the state of tires, and the like during traveling, as described above. However, JP 2003-182476 A does not suggest specific means for quantitatively predicting the braking distance of a vehicle. Further, JP 2003-182476 A does not even describe an idea of quantitatively predicting the braking distance of a vehicle based on the estimated road surface condition and tire state. Thus, conventionally, it has not been found which parameter should be used in which manner during traveling of a vehicle in order to predict quantitatively the braking distance of a vehicle during traveling of the vehicle. Therefore, a driver driving a vehicle only can predict the braking distance of a vehicle based on the driver's own sense.

Therefore, it is an object of the present invention to provide an apparatus and a method capable of predicting quantitatively the braking distance of a traveling vehicle.

In order to solve the above-mentioned problem, the present invention provides An apparatus for predicting a length of a braking distance of a vehicle equipped with tires, while the vehicle is traveling on a road, the braking distance referring to a distance at which the vehicle travels during a period from a commencement of a braking operation for stopping the vehicle to a complete stop of the vehicle, the apparatus including: an acquiring part for acquiring acceleration data in a time series of a predetermined site of the tire during traveling of the vehicle; a removing part for removing an acceleration component due to a deformation of the tire from the acquired acceleration data to obtain a modified acceleration data; an analyzing part for performing frequency analysis of the modified acceleration data to obtain a frequency spectrum; a calculating part for obtaining an accumulated value of the frequency spectrum, and calculating a braking distance parameter for predicting a braking distance based on the obtained accumulated value; and a predicting part for obtaining a predicted value of the braking distance of the vehicle based on the braking distance parameter calculated in the calculating part.

It is preferable that the apparatus of the present invention further including an acceleration sensor placed on an inner surface of the predetermined site of the tire for measuring the acceleration data.

Further, it is preferable that the apparatus of the present invention further including a transmitter, the transmitter transmitting the acceleration data measured by the acceleration sensor to the acquiring part by wireless, wherein the acquiring part includes a receiver for receiving the acceleration data transmitted by wireless.

Further, it is preferable that the apparatus of the present invention further including a storage part for storing a predetermined formula, the predetermined formula representing a correlation between the braking distance of the vehicle and the braking distance parameter; and wherein the predicting part invokes the predetermined formula stored in the storage part, and obtains the predicted value of the braking distance based on the braking distance parameter calculated in the calculating part and the predetermined formula.

Further, it is preferable that the predetermined formula is a regression equation representing a correlation between an actually measured value of the braking distance and the braking distance parameter of each of cases where a vehicle equipped with tires of a same specification as that of the tires travels on a road surface under a plurality of different traveling conditions. Herein the tire of the same specification as that of the tire refers to the tire that is the same as the tire at least in one of a size, an internal structure, and a filled air pressure. It is preferable that the tire of the same specification as that of the tire be the same as the tire in a plurality of factors among the size, internal structure, and filled air pressure, and it is more preferable that the tire of the same specification as that of the tire be the same as the tire in all the above-mentioned factors. Further, it is more preferable that the formula be of a regression equation representing a correlation between an actually measured value of the braking distance and the braking distance parameter of each of the cases where a vehicle of the same specification as that of the vehicle travels on a road surface under a plurality of different traveling conditions.

Further, it is preferable that the acquiring part acquires each of acceleration data in a time series in a plurality of different directions of a predetermined site of the tire, and wherein the removing part removes the acceleration data due to the deformation of the tire from the acceleration data in a time series in each of different directions, and wherein the analyzing part performs frequency analysis of each of the modified acceleration data in the different directions to obtain the frequency spectrum in each of the different directions, and wherein the calculating part obtains each accumulated value of each frequency spectrum in the different directions, and calculates a value obtained by multiplying an accumulated value of the frequency spectrum in each direction as the braking distance parameter.

Further, it is preferable that the acquiring part acquires data on an acceleration in a time series in a tire width direction of the tire and acceleration data in a time series in the circumferential direction of the tire, respectively. Further, it is preferable that the acquiring part acquires data on an acceleration in a time series in a tire radial direction of the tire.

Further, it is preferable that the calculating part obtains the accumulated value within a predetermined frequency range among the frequency spectrum obtained in the analyzing part.

Further, it is preferable that the acquiring part continuously acquires acceleration data in a time series of a predetermined site of the tire over a unit time defined by a time during which the tire rotates at least two rounds while the vehicle is traveling.

Further, it is preferable that the analyzing part performs frequency analysis of the modified acceleration data for each rotation time during which the tire rotates once, thereby obtaining a frequency spectrum for each rotation time; and wherein the calculating part calculates each accumulated value for each rotation time and calculates an average of the accumulated value for each rotation time as the braking distance parameter.

Further, it is preferable that the analyzing part divides a region on a circumference of the tire into a first region including a contact portion which takes contact to a road surface and the remaining second region, and performs frequency analysis of the modified acceleration data of the entire first region or only a part of the first region, thereby obtaining a frequency spectrum of the entire first region or the part of the first region.

Further, it is preferable that the removing part removes an acceleration component due to the deformation of the tire from the acceleration data in a time series obtained over a unit time defined by a time during which the tire rotates at least two rounds, and wherein the analyzing part performs frequency analysis of the modified acceleration data over a time range during which the tire rotates at least two rounds, thereby obtaining the frequency spectrum.

Further, the present invention also provides a method of predicting a length of a braking distance of a vehicle equipped with tires, while the vehicle is traveling on a road, the braking distance referring to a distance at which the vehicle travels during a period from a commencement of a braking operation for stopping the vehicle to a complete stop of the vehicle, the method including; an acquiring step for acquiring acceleration data in a time series of a predetermined site of the tire during traveling of the vehicle; a removing step for removing an acceleration component due to a deformation of the tire from the acquired acceleration data to obtain the modified acceleration data; an analyzing step for performing frequency analysis of the modified acceleration to obtain a frequency spectrum; a calculating step for obtaining an accumulated value of the frequency spectrum, and calculating a braking distance parameter for predicting a braking distance based on the obtained accumulated value; and a predicting step for obtaining a predicted value of the braking distance of the vehicle based on the braking distance parameter calculated in the calculating step.

It is preferable that, in the predicting step, a predetermined formula stored in a storage part be invoked, and the predicted value of the braking distance be obtained based on the braking distance parameter calculated in the calculating part and the formula, and the predetermined formula represent a correlation between the braking distance of the vehicle and the braking distance parameter.

Further, it is preferable that the predetermined formula is a regression equation representing a correlation between an actually measured value of the braking distance and the braking distance parameter of each of cases where a vehicle equipped with tires of a same specification as that of the tires travels on a road surface under a plurality of different traveling conditions.

By using the apparatus and the method of the present invention, a driver driving a vehicle can be informed of the braking distance of the vehicle in real time even during traveling of the vehicle. If the driver can know the braking distance of the vehicle which the driver is driving, the driver can drive the vehicle more safely and more securely.

DETAILED DESCRIPTION OF THE PREFERRED EMBODIMENTS

Hereinafter, an apparatus and a method of the present invention will be described in detail by way of preferable embodiment shown in the attached drawings.

Figure 1:
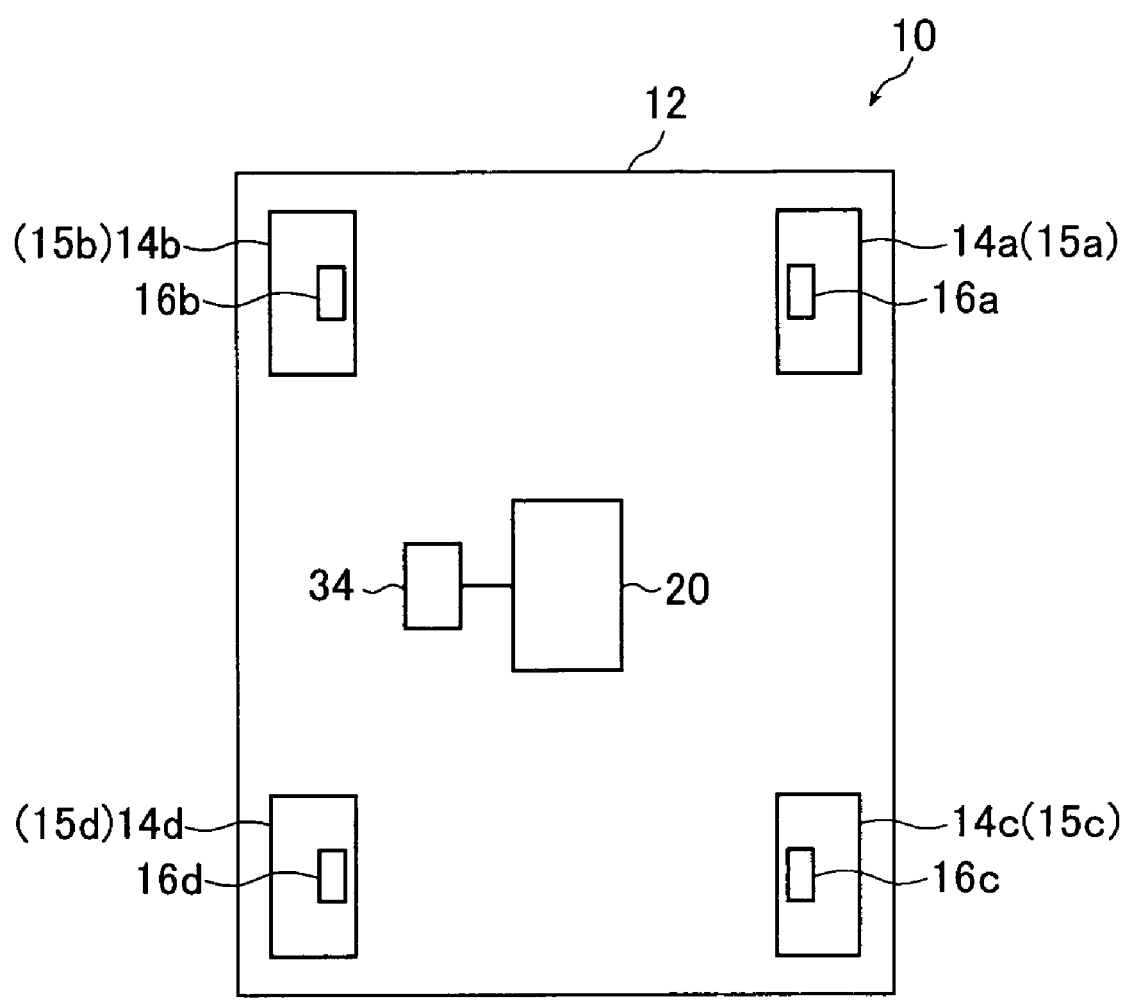
FIG. 1 is a schematic structural view illustrating an example of an apparatus of the present invention.

FIG. 1 is a schematic structural view illustrating a braking distance prediction apparatus 10 (apparatus 10) that is an example of an apparatus of the present invention. The apparatus 10 is provided in a vehicle 12 with a displacement of, for example, 2000 cc provided with four wheels 14a to 14d. The respective wheels 14a to 14d are configured so as to have tires 15a to 15d with a size of 195/65R15, for example.

The apparatus 10 includes sensor units 16a to 16d, a data processing unit 20, and a display 34. The sensor units 16a to 16d are provided respectively in the four wheels 14a to 14d, and acquire acceleration data of a predetermined site of the tires 15a to 15d (collectively referred to as the tire 15) of the respective wheels when the vehicle 12 travels on a road surface, and transmits the information through a radio signal. The sensor units 16a to 16d acquire, for example, acceleration data in a time series in a wheel radial direction (R-direction acceleration data) and acceleration data in a time series in a wheel width direction (W-direction acceleration data) of each wheel of a predetermined site of each tire 15.

The data processing unit 20 receives a radio signal transmitted from the respective sensor units 16a to 16d. More specifically, the data processing unit 20 receives, for example, R-direction acceleration data and W-direction acceleration data of a predetermined site of each tire 15 as a radio signal.

Then, the data processing unit 20 removes an acceleration component due to the ground-contact deformation of the tire 15 from the received time-series acceleration data (R-direction acceleration data and W-direction acceleration data) of a predetermined site of the respective tires 15a to 15d, and performs frequency analysis of the acceleration data after a deformation component is removed (modified acceleration data), whereby a frequency spectrum is obtained. Then, the data processing unit 20 calculates a braking distance parameter (described later), based on the obtained frequency spectrum, and obtains the braking distance of the vehicle 12 based on the calculated braking distance parameter and the previously stored formula. Herein, the formula represents a correlation between the braking distance of a vehicle and the braking distance parameter previously derived. The formula is of a regression equation representing a correlation between the actually measured value of a braking distance and the braking distance parameter (described later) for each case where the vehicle 12 equipped with the tires 15a to 15d travels on a road surface under a plurality of different traveling conditions. The formula is previously stored in a memory 27 (see FIG. 2) of the data processing unit 20. The formula representing a correlation between the braking distance of a vehicle and the braking distance parameter may be of a regression equation representing a correction between the actually measured value of a braking distance and the braking distance parameter for each case where an arbitrary vehicle with tires of the same specification as that of the tires 15a to 15d travels on a road surface under a plurality of different traveling conditions. For example, the formula is a regression equation representing a correlation between an actually measured value of the braking distance and the braking distance parameter of each of the cases where a vehicle of the same specification as that of the vehicle travels on a road surface under a plurality of different traveling speed.

In this embodiment, the above-mentioned braking distance parameter is obtained by using the time-series acceleration data (R-direction acceleration data and W-direction acceleration data) of a predetermined site of the respective tires 15a to 15d. Then, an average value of the braking distance parameter calculated for each tire is obtained, and the braking distance of the vehicle 12 is obtained based on the calculated average value of the braking distance parameter and the previously stored correlation formula. In the method and the apparatus of the present invention, time-series acceleration data with respect to particular one tire among a plurality of tires provided in a vehicle is acquired, and the braking distance of the vehicle 12 may be obtained based on the value of the braking distance parameter obtained with respect to the particular one tire and the previously stored correlation formula.

The display 34 displays the calculation results of the braking distance derived in the data processing unit 20 and the like. In the example shown in FIG. 1, although the data processing unit 20 is placed in the vehicle 12, the data processing unit 20 is portable, so it is not limited to be placed in the vehicle 12.

Figure 2:
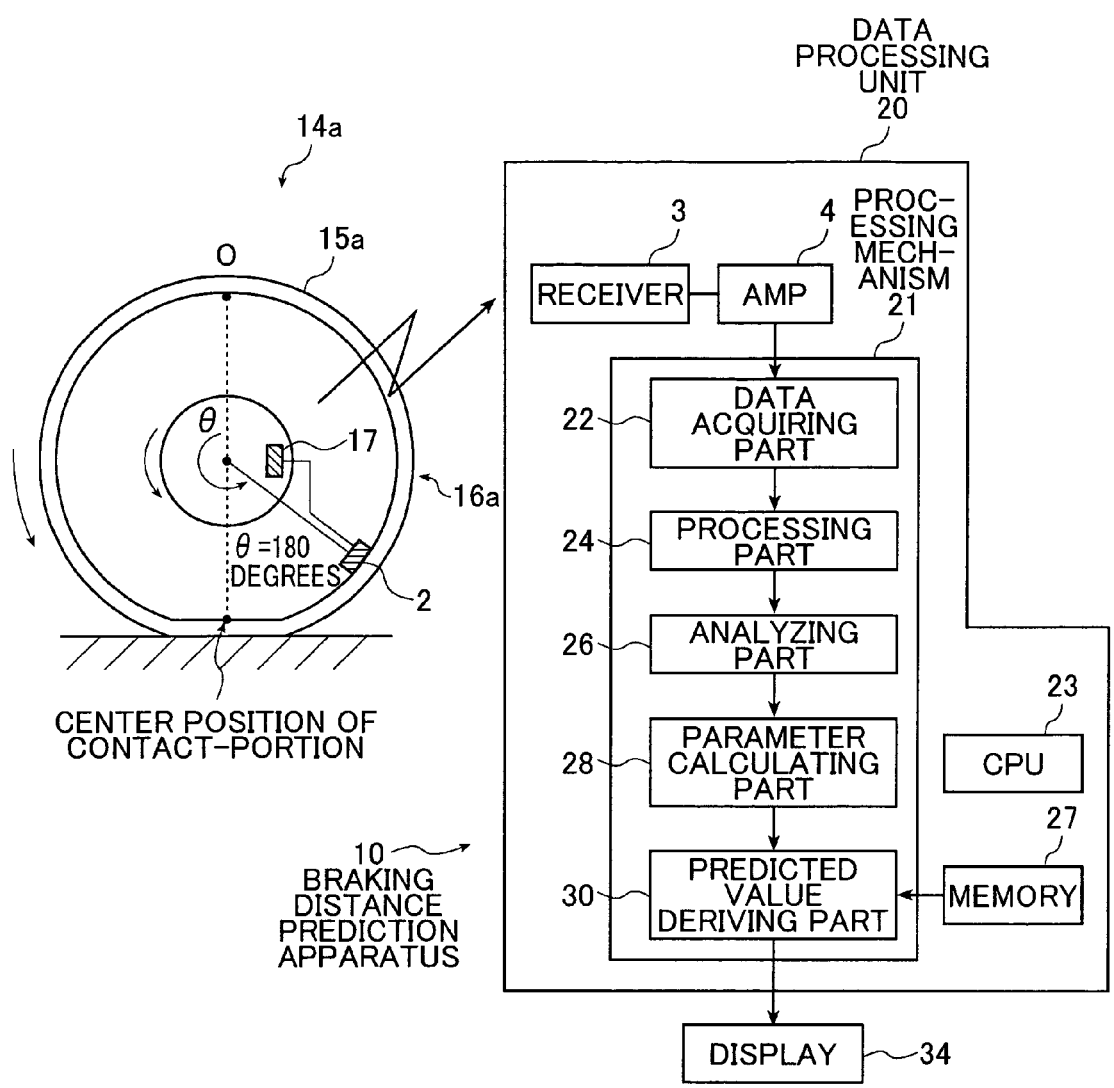
FIG. 2 is a diagram illustrating a sensor unit and a data processing unit in the apparatus shown in FIG. 1.

FIG. 2 is a diagram illustrating the sensor unit 16 (sensor units 16a to 16d) and the data processing unit 20 in the apparatus 10 shown in FIG. 1. The sensor units 16a to 16d have the same configuration. Therefore, herein, only the sensor unit 16a and the tire 15a provided with the sensor unit 16a are shown.

The sensor unit 16a is composed of an acceleration sensor 2 provided in a hollow region of the tire 15a and a transmitter 17 attached to, for example, the wheel 14a. The acceleration sensor 2 of the sensor unit 16a provided on the wheel 14a measures an acceleration in a tire radial direction and an acceleration in a tire width direction of a predetermined site of a tread portion of the tire 15a. The acceleration in a tire radial direction and the acceleration in a tire width direction measured by the acceleration sensor 2 are transmitted from the transmitter 17 of each transmission unit to the data processing unit 20. For example, the acceleration sensor 2 may be allowed to have a transmission formula separately so as to transmit the accelerations to the receiver 3, without providing the transmitter 17. Each transmitter 17 provided in the wheels 14a to 14d retains identification information (ID) for enabling each transmitter 17 to be identified, and the transmitter 17 transmits an ID together with measurement data on an acceleration measured by the corresponding acceleration sensor.

As the acceleration sensor 2, for example, a semiconductor acceleration sensor disclosed by Japanese Patent Application No. 2003-134727 filed previously by the applicant of the present application is illustrated. Specifically, the semiconductor acceleration sensor includes a Si wafer with a diaphragm formed in a Si wafer outer circumferential frame portion, and a platform for fixing the wafer outer circumferential frame portion. In a center portion of one surface of the diaphragm, a weight is provided, and a plurality of piezoelectric resistors are formed in the diaphragm. In the case where an acceleration acts on the semiconductor acceleration sensor, the diaphragm is deformed, and the resistance of the piezoresistors changes due to the deformation. A bridge circuit is formed so as to be able to detect this change as information on an acceleration. By fixing the acceleration sensor on a tire inner circumferential surface at least so that the acceleration in a tire radial direction and the acceleration in a tire width direction can be measured, the acceleration acting on a tread portion during rotation of the tire can be measured. In place of the acceleration sensor 2, an acceleration pickup using a piezoelectric element may be used, or an acceleration pickup of a distortion gauge type in which distortion gauges are combined may be used.

The acceleration sensor 2 is buried, for example, in the tread portion of a tire. Further, the acceleration sensor 2 may be attached to the surface of an inner liner of a tire. The acceleration sensor 2 may be provided at least in a region corresponding to a contact-portion of the tire, and preferably placed in a region corresponding to the ground-contact portion of the tire in a shoulder portion of the tire. Further, in this embodiment, an example in which one accelerator is placed on each tire is illustrated. However, in the present invention, there is no limit to the number of acceleration sensors to be set on each tire. For example, a plurality of acceleration sensors may be placed in a circumferential direction of the tire, or a plurality of acceleration sensors may be placed in a width direction of the tire. In the case of placing a plurality of acceleration sensors on each tire, a spectrum accumulated value (described later) may be obtained for acceleration data by each sensor, using acceleration data detected by each acceleration sensor. In this case, any one of the values obtained by the addition, subtraction, multiplication, or division of the plurality of obtained spectrum accumulated values may be used as a braking distance parameter. In this context, the tire radial direction means, a direction along a perpendicular line dropped from a position of the tire where the acceleration sensor 2 is placed to the rotation center axis of the tire 15, when the tire 15 is filled with air so that the tire 15 achieves a predetermined air pressure, and the tire 15 is kept out of contact. The tire width direction means a direction that is perpendicular to the tire radial direction, and parallel to a plane (the meridian plane of the tire 15) including the rotation center axis of the tire 15, which passes the position of the tire where the acceleration sensor 2 is placed. The tire circumferential direction means, a direction perpendicular to either of the tire radial direction and tire width direction.

The data processing unit 20 includes a receiver 3, an amplifier (AMP) 4, a processing mechanism 21, a CPU 23, and a memory 27. The data processing unit 20 is a computer in which each part shown in the processing mechanism 21 functions when the CPU 23 executes a program stored in the memory 27. The processing mechanism 21 is composed of a data acquiring part 22, a processing part 24, an analyzing part 26, a parameter calculating part 28, and a predicted value deriving part 30.

The data acquiring part 22 acquires measurement data of an acceleration in a time series in a wheel radial direction (R-direction acceleration data) and measurement data of an acceleration in a time series in a wheel width direction (W-direction acceleration data) in a tread portion of the tires 15a to 15d constituting the respective wheels 14a to 14d.

The data acquiring part 22 acquires the R-direction acceleration data and the W-direction acceleration data, because a predicted value of the braking distance of a vehicle can be derived with high precision, using vibration components in two directions orthogonal to each other of a predetermined site of the tire. Such a finding was obtained by the inventors of the present application for the first time. The inventors of the present application obtained the finding, when the inventors conducted an experiment for confirming the correlation between the vibration components in two directions orthogonal to each other of a predetermined site of the tire and the braking distance of the vehicle.

The inventors of the present application focused on fact that the braking distance of a vehicle is largely related to both the state of a tire and the condition of a road surface. Then, the inventors considered that, in order to predict a braking distance, some parameter is required, which reflects both the state of the tire and the condition of the road surface and which represents the state of a portion where the tire and the road surface are in contact with each other. Then, the inventors of the present application focused on the state of slipperiness (stick slip) of a tread as the state of the portion where the tire and the road surface are in contact with each other, and considered that the state of slipperiness (stick slip) of a tread is reflected onto the vibration of the tire. Then, the inventors of the present invention considered that such slipperiness of a tread can be represented with high precision, using not only a vibration component in one direction of a predetermined side of the tire but also the vibration components in two directions orthogonal to each other of a predetermined site of the tire so that the slipperiness is generally represented as a friction circle. The present invention has been achieved based on a new finding regarding the vibration and braking distance of a tire obtained as a result of the experiment on the relationship between the vibration of the tire and the braking distance, conducted by the inventors of the present invention based on such technical observations.

The processing part 24 receives acceleration measurement data in each direction obtained by the data acquiring part 22, and removes an acceleration signal due to the deformation of a tire from each piece of the received acceleration measurement data. The analyzing part 26 performs frequency analysis of modified acceleration data obtained by removing an acceleration component due to the deformation of a tire from the acceleration measurement data, thereby obtaining a frequency spectrum. The parameter calculating part 28 obtains an accumulated value (spectrum accumulated value) over a predetermined frequency range of the obtained frequency spectrum, and calculates a braking distance parameter for predicting a braking distance based on the obtained spectrum accumulated value. Herein, the memory 27 previously stores a formula (regression equation) representing a correlation between the above-mentioned braking distance parameter and the actual braking distance of the vehicle 12 for each case where the vehicle 12 travels on a road surface under a plurality of different traveling conditions. The predicted value deriving part 30 derives a quantitative predicted value of the braking distance of the vehicle 12 based on the braking distance parameter calculated in the parameter calculating part 28 and the above-mentioned formula previously stored in the memory 27. The derived predicted value of the braking distance of the vehicle 12 is output to be displayed on the display 34.

The display 34 is known image display means for displaying and outputting the predicted value of the braking distance of the vehicle 12 derived in the predicted value deriving part 30. The display 34 is provided at a position where a driver driving the vehicle 12 can always check the display 34 during driving. The driver driving the vehicle 12 always checks the predicted value of the braking distance displayed on the display 34, and can drive the vehicle 12 while adjusting the distance between vehicles and the traveling speed of the vehicle 12, based on the predicted value. Because of this, the driver can drive the vehicle 12 safely. The display 34 is capable of successively displaying various kinds of data and calculation results handled by the processing apparatus 21, such as the waveform of the obtained acceleration data, various kinds of calculated parameters, and the like, in addition to the braking distance of the vehicle 12 derived by the predicted value deriving part 30.

Figure 3:
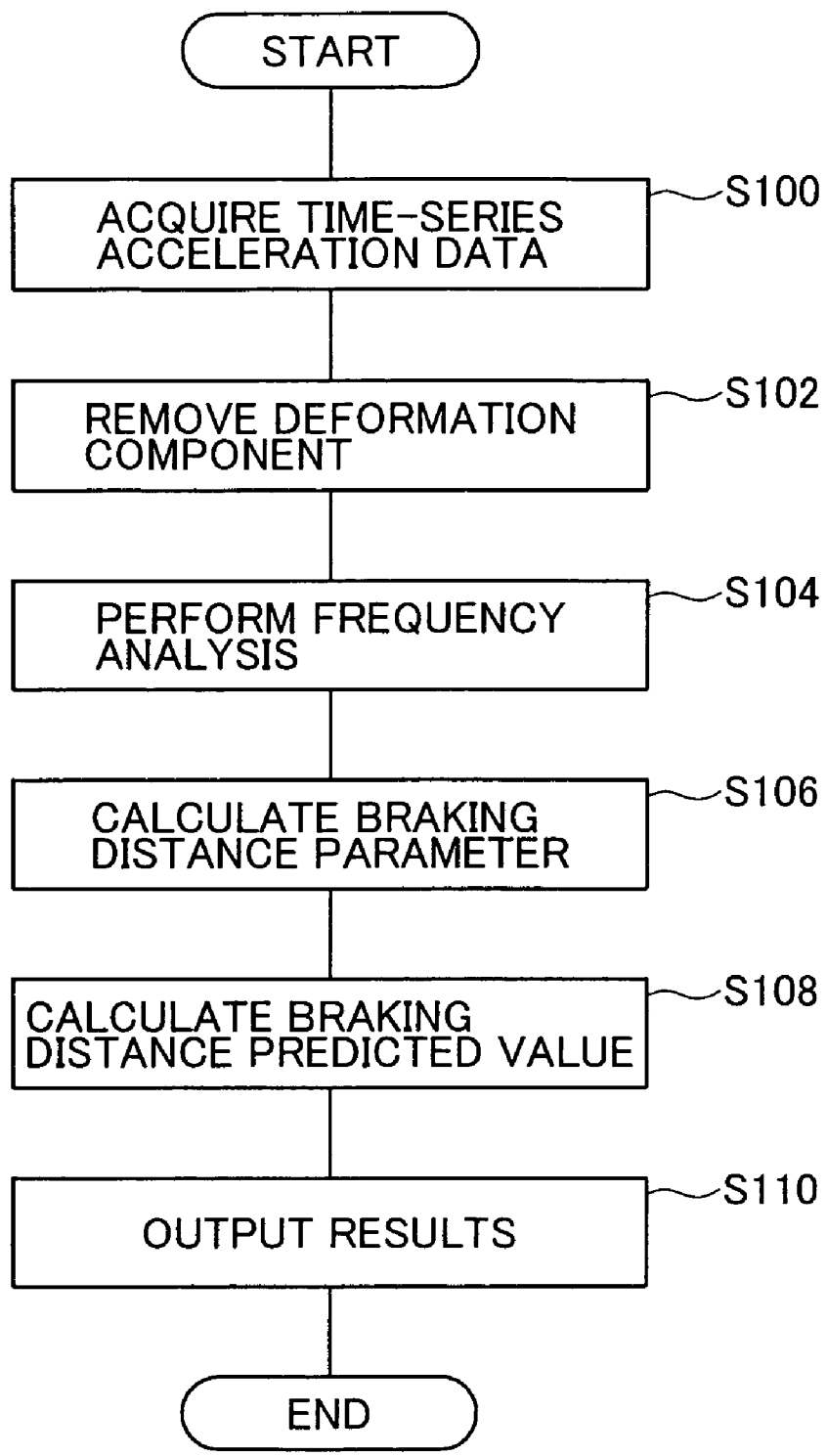
FIG. 3 is a flowchart showing an example of a method of the present invention.

FIG. 3 is a flowchart showing an example of a method of the present invention performed using the apparatus 10. Hereinafter, an example of the method of a vehicle of the present invention will be described, and the operation of each part of the apparatus 10 will be described in detail.

Hereinafter, the case where the vehicle 12 is traveling straight at a speed of 40 km/h, for example, will be described. While the vehicle 12 is traveling, the acceleration sensor 2 measures R-direction acceleration data and W-direction acceleration data. The R-direction acceleration data and the W-direction acceleration data measured by the acceleration sensor 2 are transmitted from the transmitter 17 of the transmission unit 16 to the data processing unit 20. The acceleration measurement data (radial direction acceleration measurement data) in the tire radial direction and the acceleration measurement data (width direction acceleration measurement data) in the tire width direction transmitted to the data processing unit 20 are received by the receiver 3, amplified by the amplifier 4, and acquired by the data acquiring part 22 (Step S100).

The data acquiring part 22 continuously acquires acceleration data in a time series of a predetermined site (portion where the acceleration sensor 2 is provided) of the tire 15a over a predetermined time range (acquisition time unit) during which the tire 15a rotates at least two rounds while the vehicle 12 is traveling. The data supplied from the amplifier 4 is analog data, and the data acquiring part 22 samples each of the R-direction acceleration data and the W-direction acceleration data amplified by the amplifier 4, and converts each piece of data into digital data. The digitized radial direction acceleration data and width direction acceleration data are transmitted to the processing part 24 on the basis of the above-mentioned predetermined time range (acquisition time unit) during which the tire 15a rotates at least two rounds. The data acquiring part 22 determines which wheel's measurement data on an acceleration of a tire (which wheel's acceleration data among the wheels 14a to 14d) the measurement data on an acceleration transmitted from the transmitter of each wheel corresponds to based on the ID transmitted from the transmitter 17 provided to each of the wheels 14a to 14d. Thereafter, the respective processes performed in the processing part 24 and the analyzing part 26 are performed in parallel with respect to each measurement data on a tire of each wheel.

Figure 4A:
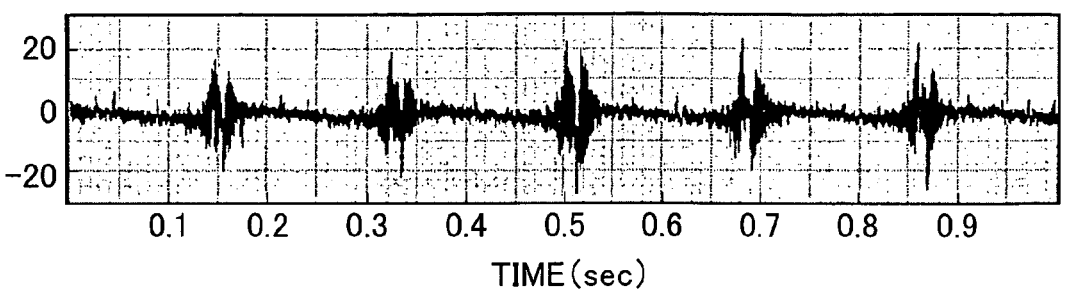
FIGS. 4(a) to 4(c) show an example of digitized acceleration data transmitted from the data acquiring part of the sensor unit shown in FIG. 2 and received by a processing part.
Figure 4B:
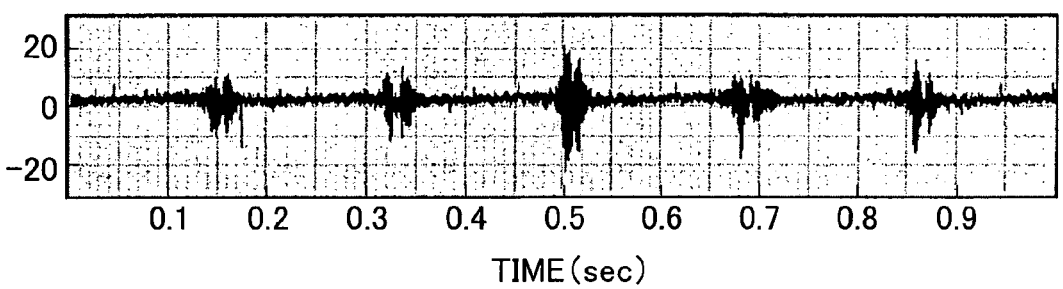
Figure 4C:
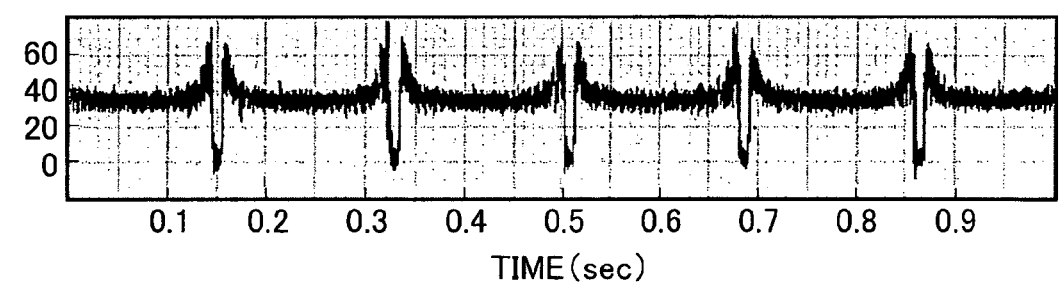

Each of FIGS. 4(a) to 4(c) is the graph showing an example of digitized acceleration data transmitted from the data acquiring part 22 and received by the processing part 24. FIG. 4(a) shows acceleration data in a tire circumferential direction (C-direction acceleration data). FIG. 4(b) shows acceleration data in a tire width direction (W-direction acceleration data). FIG. 4(c) shows acceleration data in a tire radial direction (R-direction acceleration data). FIGS. 4(a) to 4(c) show the C-direction acceleration data (FIG. 4(a)), in addition to the W-direction acceleration data (FIG. 4(b)) and R-direction acceleration data (FIG. 4(c)), which are obtained in this embodiment.

Figure 5A:
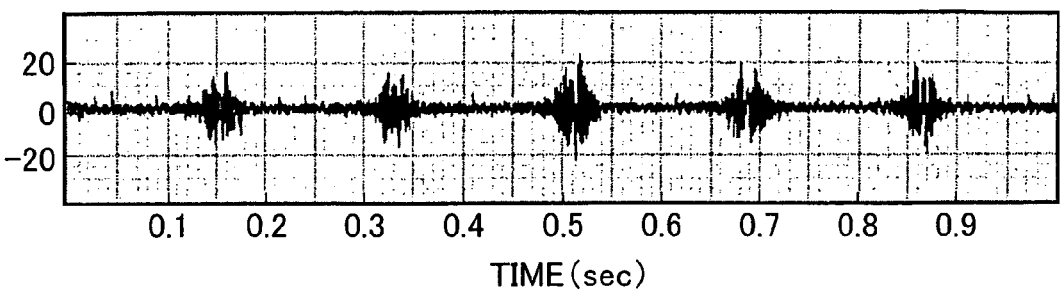
FIGS. 5(a) to 5(c) show an example of deformation-component-removed-acceleration data (modified acceleration data) obtained by processing in a signal processing part of the sensor unit shown in FIG. 2.
Figure 5B:
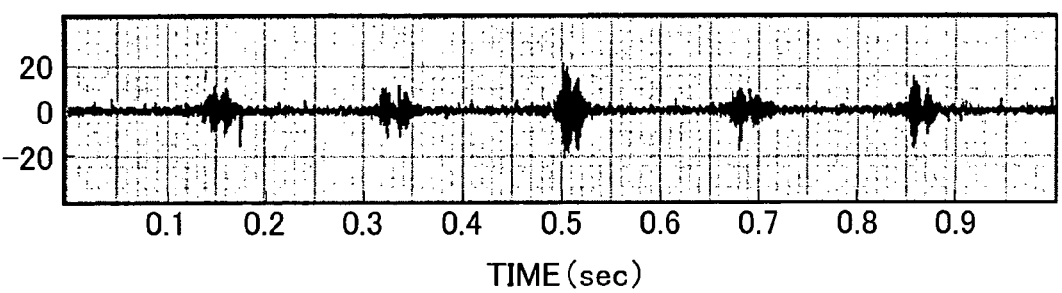
Figure 5C:
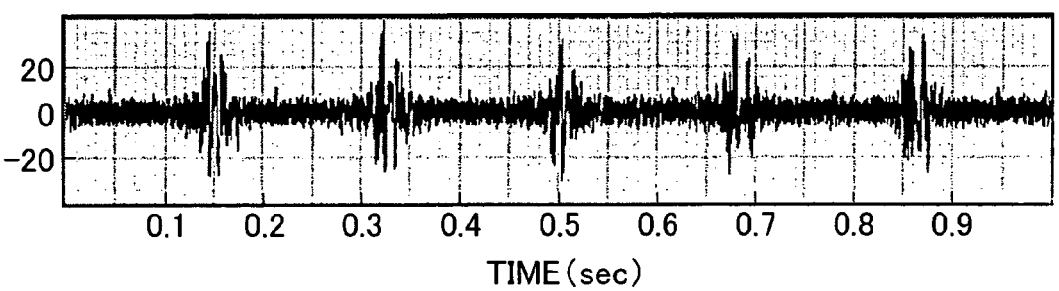

The processing part 24 removes time-series data on an acceleration due to the deformation of a tire from the digitized R-direction acceleration data and digitized W-direction acceleration data, thereby obtaining modified acceleration data (Step S102). FIGS. 5(a) to 5(c) each show the modified acceleration data obtained by processing the acceleration data shown in FIGS. 4(a) to 4(c) in the processing part 24. FIG. 5(a) shows modified acceleration data in a tire circumferential direction. FIG. 5(b) shows modified acceleration data in a tire width direction. FIG. 5(c) shows modified acceleration data in a tire radial direction.

Specifically, the processing part 24 extracts time-series data on an acceleration due to the deformation of a tire (deformation component acceleration data) by performing a procedure using a known trend model with respect to the digitized R-direction acceleration data and the digitized W-direction acceleration data. The extracted deformation component acceleration data is removed from the digitized R-direction acceleration data and the digitized W-direction acceleration data. The measurement data supplied to the processing part 24 as shown in FIGS. 4(a) to 4(c) is the data which contains a large amount of noise components such as the vibration of a tire in an acceleration component due to the deformation of the tire, with the change in an acceleration due to the deformation of the tire caused by the deformation of the tire rotation on a road surface being a trend component. The processing part 24 extracts time-series data on an acceleration due to the deformation of a tire from the measurement data as shown in FIGS. 4(a) to 4(c) by a procedure using a known trend model. Then, the processing part 24 removes the extracted deformation component acceleration data from the base data, i.e., the digitized R-direction acceleration data and the digitized W-direction acceleration data as shown in FIGS. 4(a) to 4(c), thereby obtaining modified acceleration data as shown in FIGS. 5(a) to 5(c).

In the present invention, the processing part 24 may extract time-series data on an acceleration due to the deformation of a tire using, for example, a digital filter instead of the procedure using the trend model. In this case, a digital filter with a predetermined frequency being a cut-off frequency is used. The cut-off frequency varies depending upon the rotation speed or noise component. For example, in the case where the rotating speed is 60 (km/hour), the cut-off frequency is set to 0.5 to 2 (kHz). Alternatively, smoothening processing or the like may be performed using movement average processing or the like in place of the digital filter. Thus, as the smoothening processing, any of known procedures such as the procedure using a trend model, the procedure using a digital filter, the procedure using movement average processing, and the procedure using a spline function may be used.

Figure 6A:
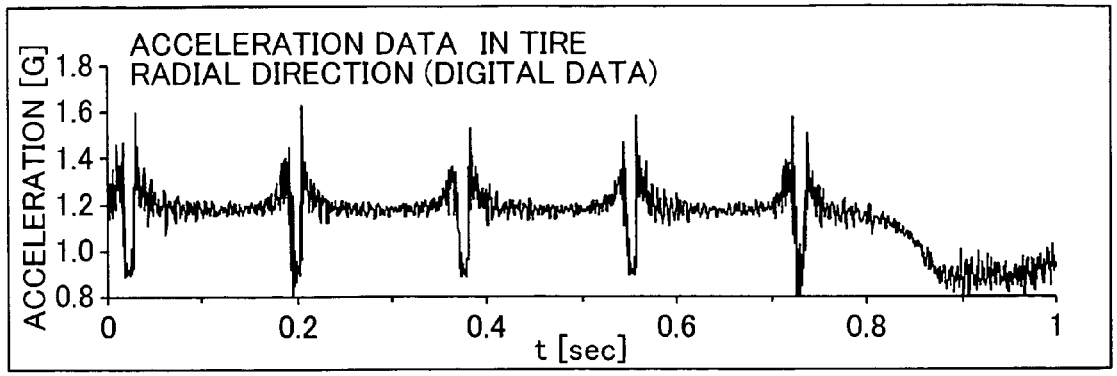
FIGS. 6(a) to 6(c) show an example of processing results obtained in another embodiment of processing in the signal processing part of the sensor unit shown in FIG. 2.
Figure 6B:
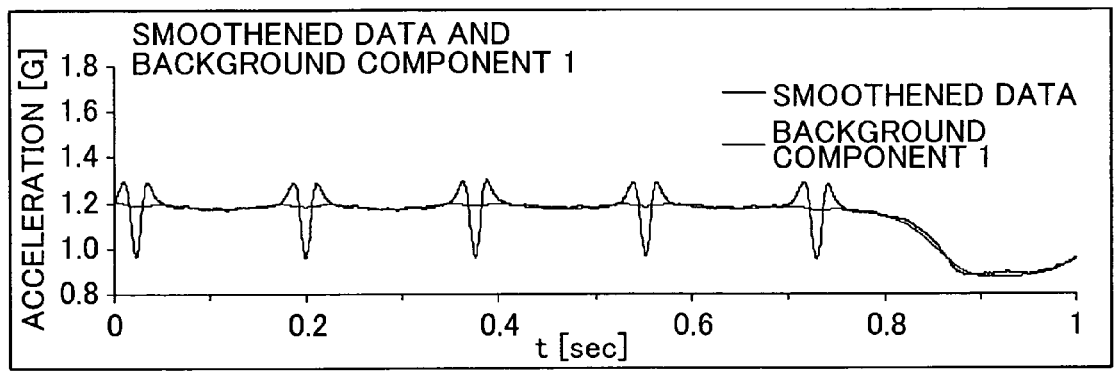
Figure 6C:
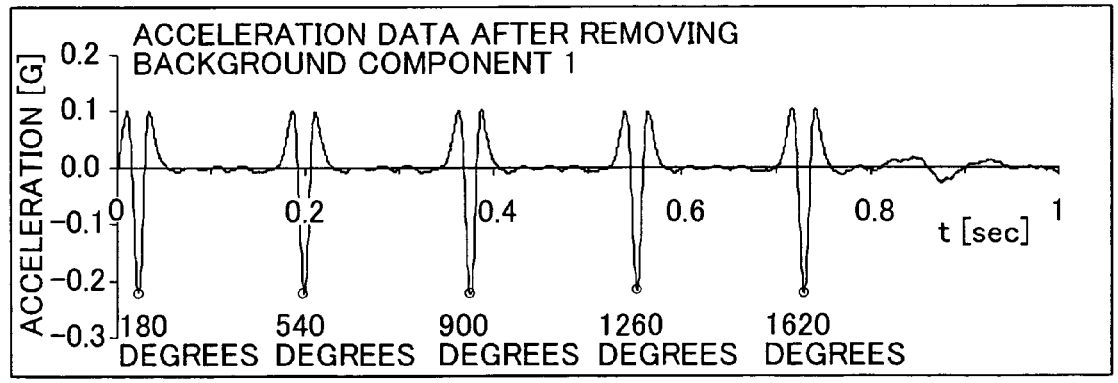

Further, the processing part 24 may extract time-series data on an acceleration due to the deformation of a tire as follows. FIGS. 6(a) to 6(c) are diagrams illustrating another example of the signal processing performed in the processing part 24. FIGS. 6(a) to 6(c) show an example in which another embodiment of the signal processing performed in the processing part 24 is carried out with respect to the R-direction acceleration data. In this embodiment, the measurement data is subjected to smoothening processing, and an approximated curve is calculated with respect to the smoothened acceleration data, whereby a background component 1 is obtained (FIG. 6(b)). Then, time-series data on an acceleration (acceleration data in a tire radial direction and acceleration data in a tire width direction) due to the deformation of a tire, which is obtained by removing the background component 1 from the smoothened acceleration data, is extracted (FIG. 6(c)).

For calculation of an approximated curve with respect to the smoothened acceleration data, any of the known procedures such as the procedure using a trend model, the procedure using a digital filter, the procedure using movement average processing, or the procedure using a spline function may be used. In the processing part 24, time-series data on an acceleration due to the deformation of a tire (deformation component acceleration data) as shown in FIG. 6(c), which is obtained by subtracting the background component 1 thus extracted from the smoothened acceleration measurement data as shown in FIG. 6(b), may be extracted.

In this embodiment, in the processing part 24, timings at which the rotation angle θ of the tire 15a shown in FIG. 2 becomes 180°, 540°, 900°, . . . are extracted respectively, using the deformation component acceleration data in a tire radial direction extracted as described above. Specifically, the processing part 24 extracts timings at which the deformation component acceleration data takes local minimum values in the graph of the time-series data on an acceleration due to the deformation of the tire in a tire radial direction as the timings at which the rotation angle θ becomes 180°, 540°, 900°, . . . (see FIG. 5(c) corresponding to another embodiment described above). More specifically, the timings of local minimum values are extracted as timings at which the acceleration sensor 2 fixed on an inner circumferential surface of a tire hollow region comes to (most approaches) a center position of a contact-portion of the tire, as shown in FIG. 2. In the tire contact-portion, the position of the tire outer circumferential surface in a direction perpendicular to the road surface is defined by the road surface. In the contact-portion, the road surface deforms the tire outer circumferential surface that originally has a curvature into a flat surface, so the tire is deformed in the thickness direction. Because of this, the position on the inner circumferential surface of the tire hollow region varies more or less in the tire thickness direction (direction perpendicular to the road surface) in the contact-portion. The deformation in a tire radial direction becomes smallest at the center position of the contact-portion. The timings at which the acceleration due to the deformation of the tire in the tire radial direction, which is acquired by the acceleration sensor placed on the inner circumferential surface of the tire hollow region, becomes local minimum can be considered as timings at which the above-mentioned rotation angle θ becomes 180°, 540°, 900°, . . . respectively.

From the rotation angles θ and the timings thus obtained, the processing part 24 sets a time region in which there is a high possibility that the acceleration sensor 2 is placed in a region corresponding to the tire ground-contact portion, among the above-mentioned acquisition time units. Specifically, a region with the angle θ in a range of more than 90° and less than 270°, more than 450° and less than 720°, and more than 810° and less than 980° is determined as a first region in which there is a high possibility that the acceleration sensor 2 is placed in a region corresponding to the tire contact-portion, and a region with the angle θ in a range of 0° or more to 90° or less, 270° or more to 360° or less, 360° or more to 450° or less, 630° or more to 720° or less, and 720° or more to 810° or less, and 980° or more to 1070° or less is determined as a second region in which there is a low possibility that the acceleration sensor 2 is placed in a region corresponding to the tire contact-portion portion. The processing part 24 sends the modified acceleration data after an acceleration component due to the deformation of the tire is removed, and the information on the first and second regions to the analyzing part 26.

Figure 7A:
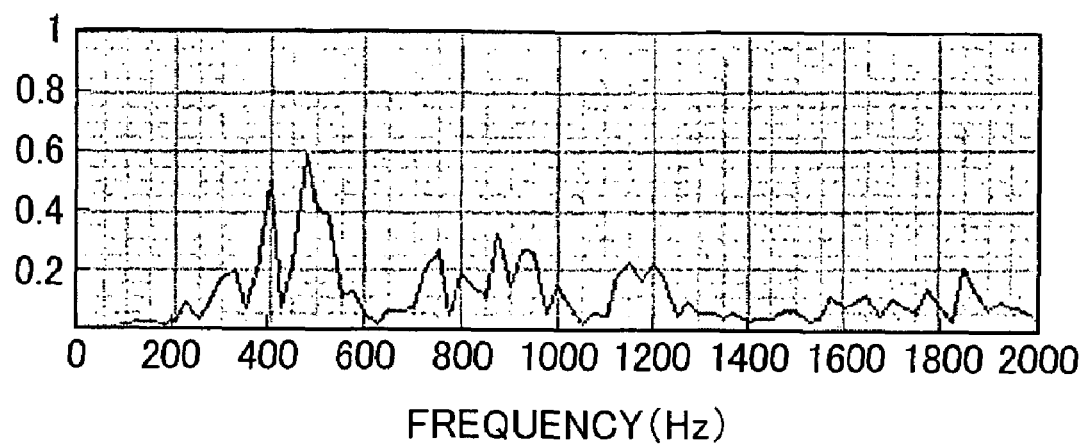
FIGS. 7(a) to 7(c) show an example of a frequency spectrum obtained in processing in an analyzing part shown in FIG. 2.
Figure 7B:
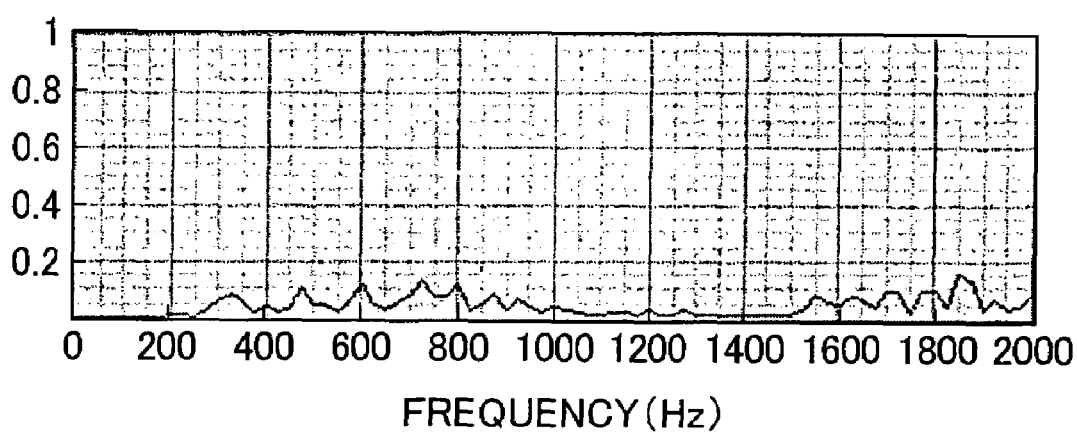
Figure 7C:
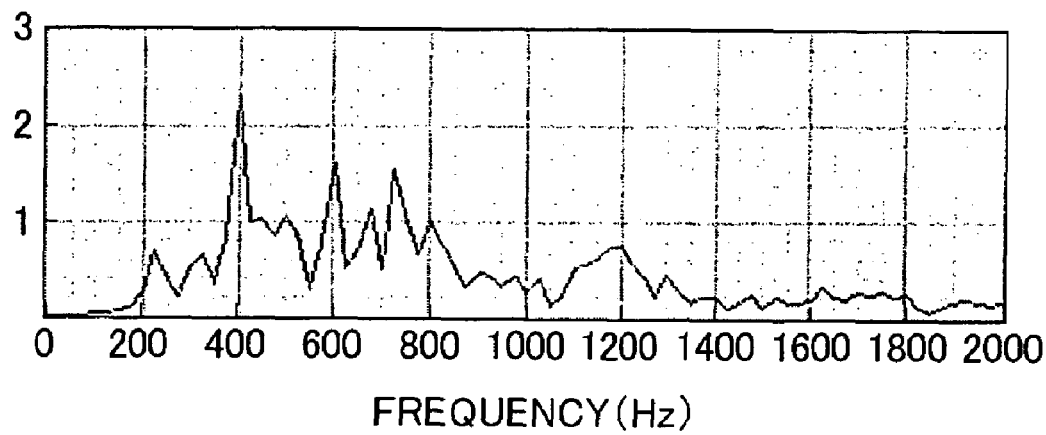

The analyzing part 26 performs frequency analysis of the modified acceleration data of an acquisition time unit received from the processing part 24, thereby obtaining a frequency spectrum (Step S104). FIGS. 7(a) to 7(c) show frequency spectra of the modified acceleration data shown in FIGS. 6(a) to 6(c). FIG. 7(a) shows a frequency spectrum in a tire circumferential direction. FIG. 7(b) shows a frequency spectrum in a tire width direction. FIG. 7(c) shows a frequency spectrum in a tire radial direction. In this embodiment, in the analyzing part 26, the modified acceleration data over an acquisition time unit (the above-mentioned predetermined time range in which the tire rotates at least two rounds) is subjected to frequency analysis for each rotation time unit during which the tire rotates once, whereby a frequency spectrum for each rotation time unit is obtained, respectively. Then, a value obtained by averaging the frequency spectrum for each rotation time unit is obtained as an acquisition time unit frequency spectrum. In the analyzing part 26, when a frequency spectrum for each rotation time unit is obtained, frequency analysis for each rotation time unit is performed only for the first time region in which there is a high possibility that a vibration component in a contact-portion between the tire and the road surface is contained. The reason why a frequency spectrum is obtained only for the first time region in which there is a high possibility that a vibration component in a contact-portion is contained is to reflect the change in a vibration component of the tire in the contact-portion on the change in a frequency spectrum more precisely. The acquisition time unit frequency spectrum obtained in the analyzing part 26 is sent to the parameter calculating part 28. In the case where a partial time region, in which there is a relatively high possibility that the vibration component in the contact-portion is contained among the above-mentioned first time region, is known, etc., frequency analysis may be performed only for the partial time region to obtain a frequency spectrum for each rotation time unit. The present invention is not limited to the frequency analysis only for the above-mentioned first time region, and frequency analysis may be performed for the entire rotation time unit to obtain a frequency spectrum for each rotation time unit.

Next, the parameter calculating part 28 calculates a braking distance parameter (Step S106). The parameter calculating part 28 first receives the acquisition time unit frequency spectrum obtained in the analyzing part 26, and calculates an accumulated value (spectrum accumulated value) over a predetermined frequency range of the acquisition time unit frequency spectrum. The parameter calculating part 28 obtains a spectrum accumulated value of a predetermined frequency range among the frequency spectrum acquired in the analyzing part 26. In this embodiment, for example, a spectrum accumulated value in a frequency band of 1 kHz to 1.5 kHz is obtained by using each frequency spectrum of the width direction acceleration data and the radial direction acceleration data, and a value obtained by multiplying each accumulated value of the width direction acceleration and the radial direction acceleration is calculated as a braking distance parameter. The value of the braking distance parameter calculated by the parameter calculating part 28 is sent to the predicted value deriving part 30. In the present invention, in the frequency analyzing part, a spectrum obtained by performing frequency analysis of the modified acceleration data in the entire range of the acquisition time during which the tire rotates at least two rounds may be set as the above-mentioned acquisition time unit frequency spectrum, and a braking distance parameter may be obtained using the frequency spectrum.

The reason why the parameter calculating part 28 derives a spectrum accumulated value over a predetermined frequency range is that, generally, most of the above-mentioned slipperiness (stick slip) of a tread reflected on the braking distance occurs in a range of 500 Hz to 1.5 kHz, and particularly, in the specification of this embodiment, the slipperiness occurs most frequently in a frequency band in a range of 1 kHz to 1.5 kHz. The spectrum accumulated value over such a frequency band represents the degree of vibration of a tire occurring due to the slipperiness of a tread with good precision.

Next, the predicted value deriving part 30 derives a predicted value of the braking distance of the vehicle 12 based on the braking distance parameter calculated in the parameter calculating part 28 and a formula (regression equation) previously stored in the memory 27 (Step S108).

Figure 8:
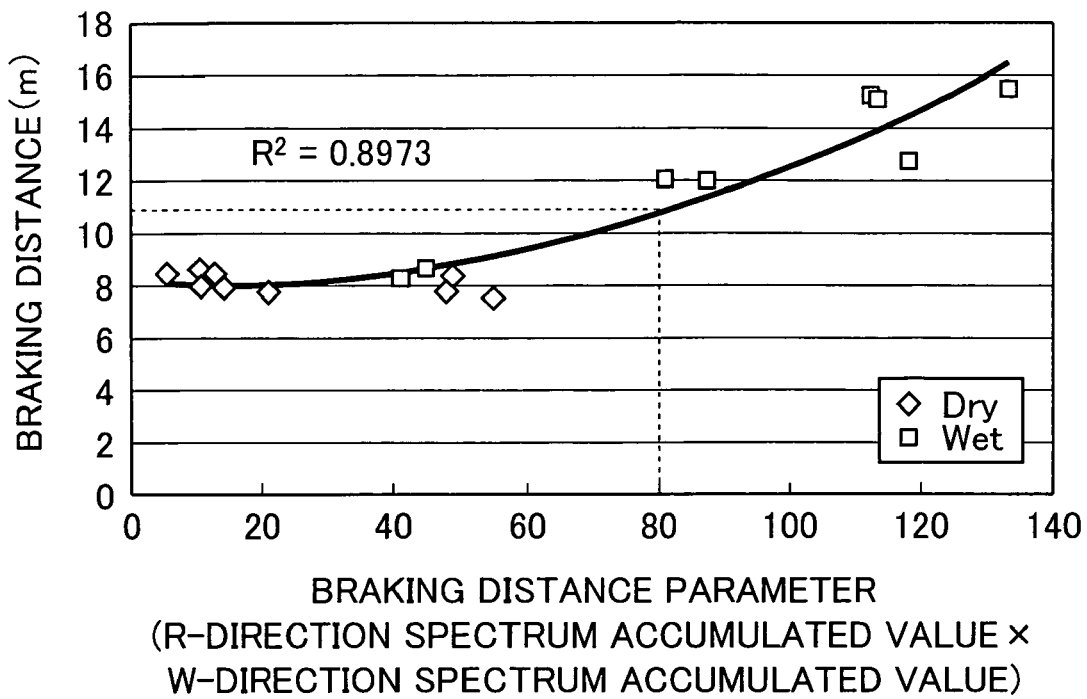
FIG. 8 is an example of a scatter diagram representing a correspondence relationship between the braking distance parameter and the braking distance for each case where a particular vehicle is allowed to travel on a road surface under a plurality of different traveling conditions.

FIG. 8 shows a scatter diagram representing a correspondence relationship between the braking distance parameter and the braking distance for each case where the vehicle 12 is allowed to travel on a road surface under a plurality of different traveling conditions. The scatter diagram shown in FIG. 8 also shows a graph of a formula (regression equation) representing the correlation between the braking distance parameter and the braking distance, which are derived based on such a correspondence relationship. Each data represented as the scatter diagram in FIG. 8 is a scatter diagram showing a correspondence between the value of a braking distance parameter (spectrum accumulated value in a tire radial direction×spectrum accumulated value in a tire width direction) obtained using the apparatus 10 and the measured value of an actual braking distance, while the vehicle 12 with a displacement of 2000 cc equipped with the tires 15*a* to 15*d* of 195/65R15 size is traveling at a speed of 40 km/h. Herein, the measured value of the actual braking distance refers to an actually measured value of a braking distance of a particular vehicle in the case where a driver puts on brake pedal of the particular vehicle instantaneously under the traveling condition in which each braking distance parameter is derived, to thereby stop the particular vehicle under the control of ABS. Among the pieces of data shown in FIG. 8, the data represented as "Dry" is actually measured value data in the case where the road surface condition is dry. The data represented as "Wet" is actually measured value data in the case where the road surface condition is wet. The graph shown in FIG. 8 is an approximated curve (regression equation) representing the correlation between the braking distance parameter and the braking distance, and in this example, the regression equation is a quadric.

As shown in FIG. 8, the value of a braking distance parameter obtained by multiplying the spectrum accumulated value in a tire radial direction (R-direction spectrum accumulated value) by the spectrum accumulated value in a tire width direction (W-direction spectrum accumulated value) has a satisfactory correlation with the braking distance (in the example shown in FIG. 8, a correlation coefficient R2 is about 0.9). The braking distance is represented in the form in which the R-direction spectrum accumulated value and the W-direction spectrum accumulated value are interpolated. If the correlation coefficient R2 between the braking distance parameter and the braking distance is, for example, 0.7 or more, preferably 0.8 or more, the braking distance can be derived with relatively high precision, based on the braking distance parameter. The braking distance parameter (braking distance parameter calculated based on an accumulated value of a frequency spectrum obtained by performing frequency analysis of modified acceleration data) calculated in the present invention satisfies the condition of the correlation coefficient R2 between the braking distance parameter and the braking distance of 0.7 or more, preferably 0.8 or more.

The predicted value deriving part 30 derives a quantitative predicted value of the braking distance at which the vehicle 12 moves before stopping in the case where a braking operation (emergency stopping operation under the control of ABS) of the vehicle 12 is performed under the current traveling condition, using the above-mentioned regression equation. For example, in the case of using an approximated curve (regression equation) shown in the graph of FIG. 8, assuming that the value of the braking distance parameter calculated in the parameter calculating part 28 is 80, the predicted value deriving part 30 calculates a predicted value of a braking distance to be about 11 m. In the present invention, the traveling speed of a vehicle may vary while the vehicle is traveling. In such case, for example, the predicted value deriving part acquires a speed-data representing traveling speed of the vehicle at the timing when the braking operation is starting, and derives predicted value of braking distance by using a formula corresponding to the acquired speed-data. In such case, the predicted value deriving part may receive the speed-data transmitted by the well-known speedometer of the vehicle.

The derived predicted value of the braking distance of the vehicle 12 is outputted and displayed on the display 34 (Step S110). The processes in Steps S100 to S110 are repeated during the traveling of the vehicle 12. A driver driving the vehicle 12 can always grasp to what degree the vehicle 12 travels before stopping (the degree of the braking distance of the vehicle 12) when a braking operation is performed in the current traveling condition. The driver can drive the vehicle more safely by driving the vehicle in accordance with such information.

Figure 9:
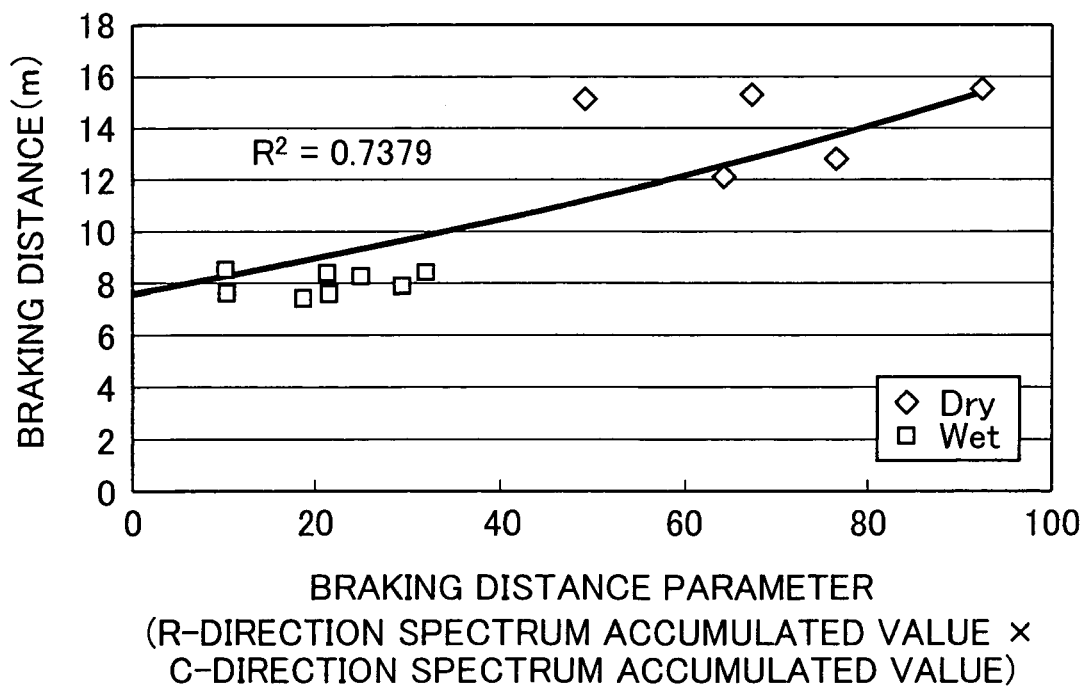
FIG. 9 is an example of a scatter diagram representing a correspondence relationship between the braking distance parameter and the braking distance, which shows an example using a value obtained by multiplying the circumferential direction spectrum accumulated value of a tire with a radial direction spectrum accumulated value of the tire as a braking distance parameter.
Figure 10:
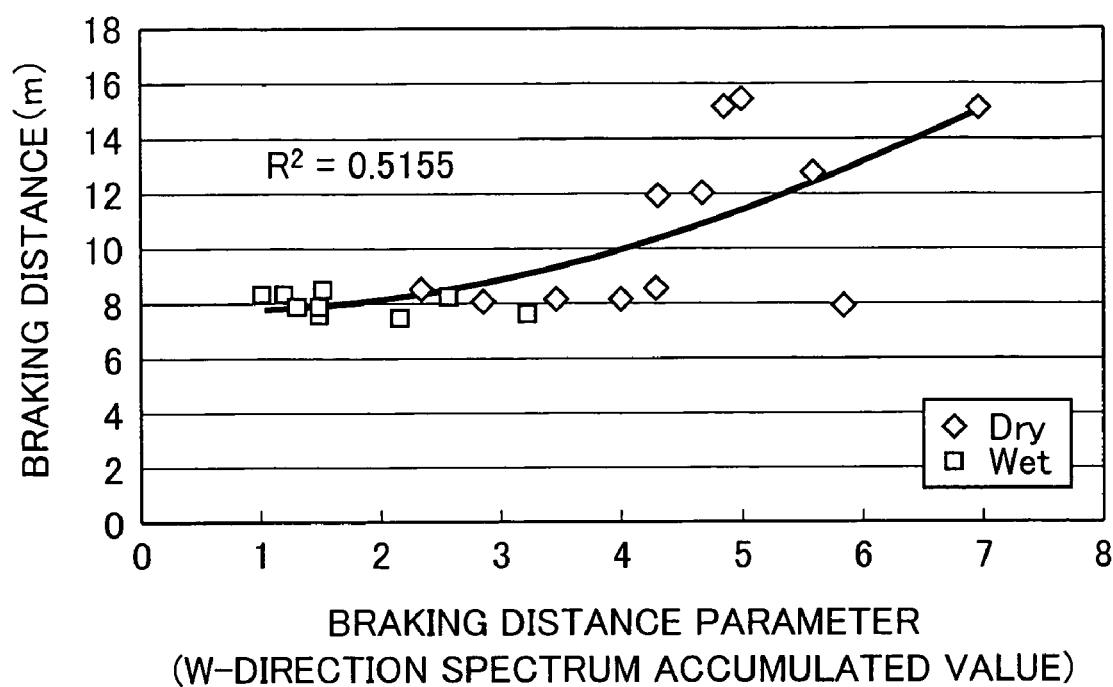
FIG. 10 is an example of a scatter diagram representing a correspondence relationship between the braking distance parameter and the braking distance, which shows an example using a width direction spectrum accumulated value of a tire as a braking distance parameter.

In the method and the apparatus of the present invention, the braking distance parameter is not limited to the use of a value obtained by multiplying the R-direction spectrum accumulated value with the W-direction spectrum accumulated value. FIGS. 9 and 10 are scatter diagrams showing a correspondence relationship between the braking distance parameter and the braking distance for each case where the same particular vehicle as that shown in FIG. 8 travels on a road surface under the traveling conditions similar to those in FIG. 8, and showing the case of using a parameter different from that in the example shown in FIG. 8 as a braking distance parameter. In the scatter diagram of FIG. 9, as a braking distance parameter, the value obtained by multiplying the circumferential direction (C-direction) spectrum accumulated value of a tire with the R-direction spectrum accumulated value of a tire is used. In the scatter diagram of FIG. 10, as a braking distance parameter, the W-direction spectrum accumulated value is used as the braking distance parameter. In the present invention, each value as described above may be used as a braking distance parameter. As is apparent from the comparison between each scatter diagram and each graph (in addition, correlation coefficient described in each scatter diagram) showing a correlation between each braking distance parameter and a braking distance shown in FIGS. 8 to 10, it is preferable to use a value obtained by multiplying each spectrum accumulated value in two directions orthogonal to the tire vibration, as well as a spectrum accumulated value in one direction of the tire vibration as a braking distance parameter. Further, two directions orthogonal to each other are particularly preferably the radial direction of a tire and the width direction of a tire.

The apparatus and the method of the present invention have been described in detail. However, the present invention is not limited to the above embodiment and may be variously altered or changed as long as it does not depart from the gist of the present invention.

What is claimed is:

1. An apparatus for predicting a length of a braking distance of a vehicle equipped with tires, when a breaking operation is performed for stopping the vehicle while the vehicle is traveling on a road, the braking distance referring to a distance at which the vehicle travels during a period from a commencement of the braking operation for stopping the vehicle to a complete stop of the vehicle, the apparatus including:

an acquiring part for acquiring acceleration data in a time series of a predetermined site of the tire during traveling of the vehicle;

a removing part for removing an acceleration component due to a deformation of the tire from the acquired acceleration data to obtain a deformation-component-removed acceleration data;

an analyzing part for performing frequency analysis of the deformation-component-removed acceleration data to obtain a frequency spectrum;

a calculating part for obtaining an accumulated value of the frequency spectrum, and calculating a braking distance parameter for predicting a braking distance based on the obtained accumulated value; and a predicting part for obtaining a predicted value of the braking distance of the vehicle based on the braking distance parameter calculated in the calculating part, wherein the acquiring part acquires acceleration data in a time series in a plurality of different directions of the predetermined site of the tire, the removing part obtains the deformation-component-removed acceleration data in the plurality of different directions from the acceleration data in the time series in the plurality of different directions, the analyzing part performs frequency analysis of the deformation-component-removed acceleration data in the plurality of different directions to obtain the frequency spectrum, in the plurality of different directions, the calculating part obtains accumulated values of the frequency spectrum in the plurality of different directions and calculates the braking distance parameter based on the accumulated values in the plurality of different directions.

2. The apparatus according to claim 1, wherein the calculating part calculates a value obtained by addition, subtraction, multiplication or division of the accumulated values in the plurality of different directions as the braking distance parameter.

3. The apparatus according to claim 2, wherein the calculating part calculates a value obtained by multiplication of The accumulated values in the plurality of different directions as the braking distance parameter.

4. The apparatus according to claim 1, wherein the acquiring part acquires an acceleration data in a time series in a tire width direction of the tire perpendicular to the circumferential direction of the tire and an acceleration data in a time series in the radial direction of the tire, respectively.

5. The apparatus according to claim 1, further including an acceleration sensor placed on the predetermined site of the tire for measuring The acceleration data of the predetermined site.

6. The apparatus according to claim 5, further including a transmitter, the transmitter transmitting the acceleration data measured by the acceleration sensor to the acquiring part by wireless, wherein The acquiring part includes a receiver for receiving the acceleration data transmitted by wireless.

7. The apparatus according to claim 1,
further including a storage part for storing a predetermined formula, the predetermined formula representing a correlation between the braking distance of the vehicle and the braking distance parameter; and wherein the predicting part invokes the predetermined formula stored in the storage part, and obtains The predicted value of the braking distance based on the braking distance parameter calculated in the calculating part and the predetermined formula.

8. The apparatus according to claim 7, wherein the predetermined formula is a regression equation representing a correlation between an actually measured value of the braking distance and the braking distance parameter of each of cases where a vehicle equipped with tires of a same specification as that of the tires travels on a road surface under a plurality of different traveling conditions.

9. The apparatus according to claim 1, wherein the calculating part obtains the accumulated values within a predetermined frequency range among the frequency spectrum obtained in the analyzing part.

10. The apparatus according to claim 1, wherein the acquiring part continuously acquires acceleration data in a time series of the predetermined site of the tire over a unit time defined by a time during which the tire rotates at least two rounds while the vehicle is traveling.

11. The apparatus according to claim 10;
wherein the analyzing part performs frequency analysis of the modified acceleration data for each rotation time during which the tire rotates once, thereby obtaining a frequency spectrum for each rotation time; and
wherein the calculating part calculates each accumulated value for each rotation time and calculates the braking distance parameter using an average of the accumulated value for each rotation time.

12. The apparatus according to claim 10;
wherein the removing part removes the acceleration component due to the deformation of the tire from the acceleration data in a time series obtained over a unit time defined by a time during which the tire rotates at least two rounds, and
wherein the analyzing part performs frequency analysis of the deformation-component-removed acceleration data in its entirety over a time range during which the tire rotates at least two rounds, thereby obtaining the frequency spectrum.

13. The apparatus according to claim 1;
wherein the analyzing part divides a region on a circumference of the tire into a first region including a contact portion which takes contact to a road surface and the remaining second region, and performs frequency analysis of the deformation-component-removed acceleration data of the entire first region or only a part of the first region excluding a region corresponding to the second region, thereby obtaining a frequency spectrum of the entire first region or the part of the first region.

14. A method of predicting a length of a braking distance of a vehicle equipped with tires, when a breaking operation is performed for stopping the vehicle while the vehicle is traveling on a road, the braking distance referring to a distance at which the vehicle travels during a period from a commencement of a braking operation to a complete stop of the vehicle, the method including;

an acquiring step for acquiring acceleration data in a time series of a predetermined site of the tire during traveling of the vehicle;

a removing step for removing an acceleration component due to a deformation of the tire from the acquired acceleration data to obtain the deformation-component-removed acceleration data;

an analyzing step for performing frequency analysis of the deformation-component-removed acceleration data to obtain a frequency spectrum;
a calculating step for obtaining an accumulated value of the frequency spectrum, and calculating a braking distance parameter for predicting a braking distance based on the obtained accumulated value; and
a predicting step for obtaining a predicted value of the braking distance of the vehicle based on the braking distance parameter calculated in the calculating step, wherein
in the acquiring step, acceleration data in a time series in a plurality of different directions of the predetermined she of the tire are acquired,
in the removing step, the deformation-component-removed acceleration data in the plurality of different directions are obtained from the acceleration data in the time series in the plurality of different directions,
in the analyzing step, frequency analysis of the deformation-component-removed acceleration data in the plurality of different directions is performed to obtain the frequency spectrum, in the plurality of different directions,
in the calculating step, accumulated values of the frequency spectrum in the plurality of different directions are obtained, and the braking distance parameter is calculated based on the accumulated values in the plurality of different directions.

15. The method according to claim 14 in the calculating step, a value obtained by addition, subtraction, multiplication or division of the accumulated values in the plurality of different directions is calculated as the braking distance parameter.

16. The method according to claim 14, in the calculating step, a value obtained by multiplication of the accumulated values in the plurality of different directions is calculated as the braking distance parameter.

17. The method according to claim 14; wherein, in the predicting step, a predetermined formula stored in a storage part is invoked, and the predicted value of The braking distance is obtained based on the braking distance parameter calculated in the calculating step and the formula, and the predetermined formula represents a correlation between the braking distance of the vehicle and the braking distance parameter.

18. The method according to claim 17, wherein the predetermined formula is a regression equation representing a correlation between an actually measured value of The braking distance and the braking distance parameter of each of cases where a vehicle equipped with tires of a same specification as that of the tires travels on a road surface under a plurality of different traveling conditions.

* * * * *